United States Patent
Jones

(10) Patent No.: US 11,112,038 B2
(45) Date of Patent: Sep. 7, 2021

(54) PIPE-FITTING

(71) Applicant: Georg Fischer Central Plastics LLC, Shawnee, OK (US)

(72) Inventor: James Charles Jones, Aledo, TX (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 317 days.

(21) Appl. No.: 16/053,010

(22) Filed: Aug. 2, 2018

(65) Prior Publication Data
US 2020/0041048 A1    Feb. 6, 2020

(51) Int. Cl.
*F16L 21/00*    (2006.01)
*F16L 21/02*    (2006.01)

(52) U.S. Cl.
CPC ................. *F16L 21/022* (2013.01)

(58) Field of Classification Search
CPC ..... F16L 21/022; F16L 21/03; F16L 37/0845; F16L 37/0842; F16L 37/0925; F16L 17/035; F16L 41/04; F16L 33/02; F16D 3/00; G10B 3/08
USPC ......................... 285/342, 343, 374
See application file for complete search history.

(56) References Cited

U.S. PATENT DOCUMENTS

| 2,201,372 | A | * | 5/1940 | Miller | F16L 37/0845 285/105 |
| 7,328,493 | B2 | | 2/2008 | Jones et al. | |
| 7,815,225 | B2 | | 10/2010 | Jones et al. | |
| 8,235,427 | B2 | | 8/2012 | Jones et al. | |
| 9,851,029 | B2 | | 12/2017 | Jones | |
| 2008/0284166 | A1 | * | 11/2008 | Darce | F16L 21/03 285/337 |
| 2010/0078937 | A1 | * | 4/2010 | Jones | F16L 37/0845 285/345 |
| 2010/0244442 | A1 | * | 9/2010 | Jones | F16L 37/0845 285/374 |

FOREIGN PATENT DOCUMENTS

WO    WO-2014079882 A1 *    5/2014    ..........    F16L 37/0845

* cited by examiner

*Primary Examiner* — Matthew Troutman
*Assistant Examiner* — James A Linford
(74) *Attorney, Agent, or Firm* — Harness, Dickey & Pierce, P.L.C.

(57) ABSTRACT

A pipe-fitting includes a coupling and a flexible pipe-restraint gasket. The coupling includes a bell that defines a pipe insertion mouth at an end of the coupling and an inner recess. The flexible pipe-restraint gasket assembly is disposed within the inner recess and includes an annular body, a plurality of discrete gripping members and at least one extension portion. The plurality of gripping members are disposed around an outer periphery of the body. The at least one extension portion extends from the body and is disposed between a pair of the plurality of gripping members. The at least one extension portion defines a pocket.

19 Claims, 12 Drawing Sheets

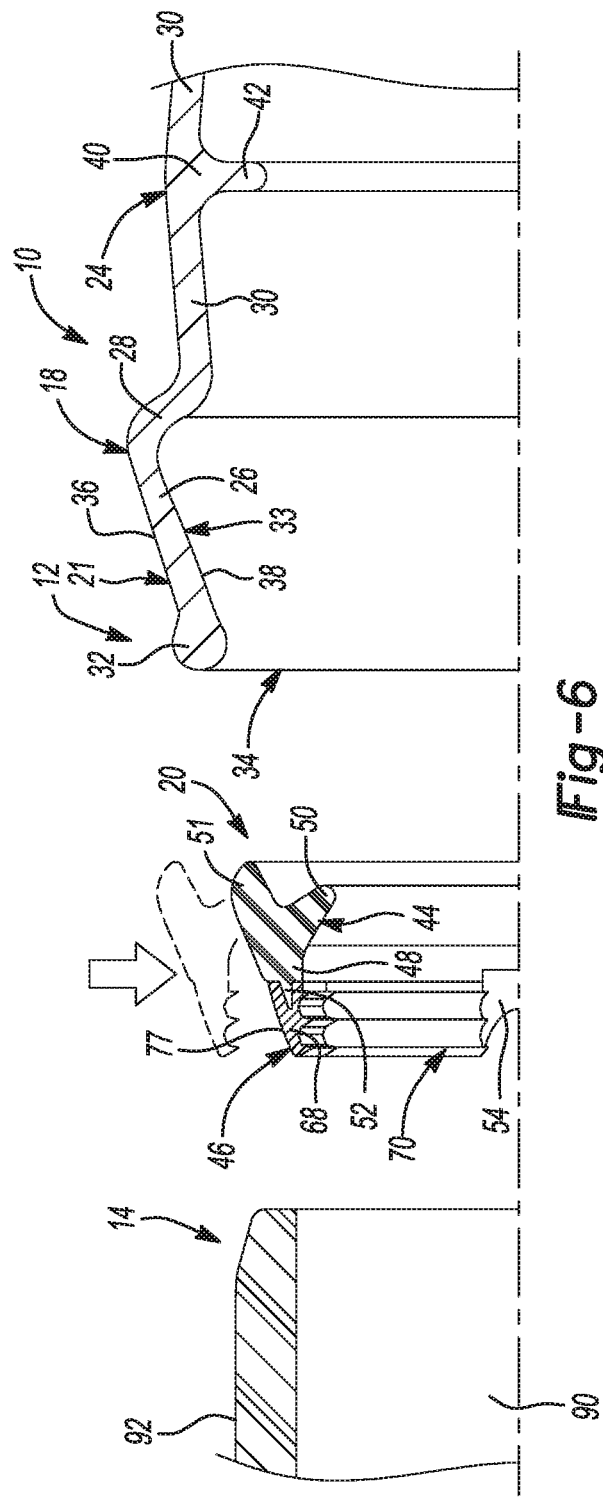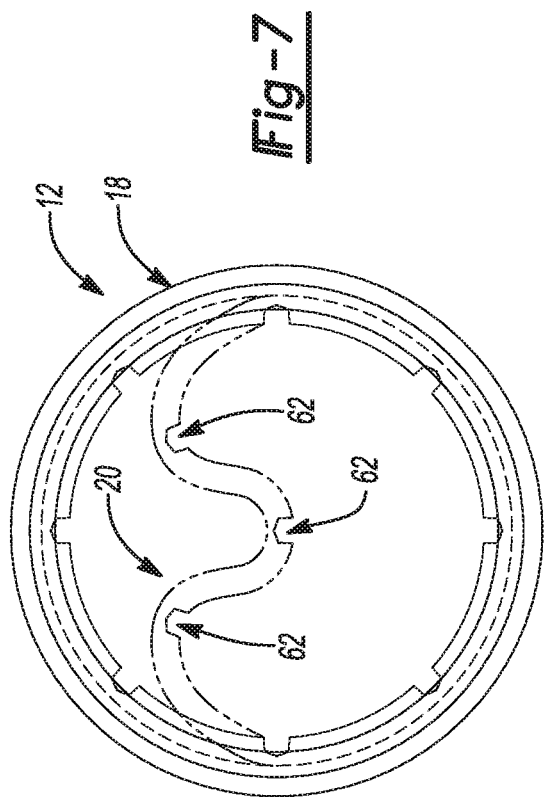

PIPE-FITTING

FIELD

The present disclosure relates to a pipe-fitting.

BACKGROUND

This section provides background information related to the present disclosure which is not necessarily prior art.

Traditionally, pipe-fittings have been used to join two or more metallic pipes (e.g., ductile iron pipes) to each other, such as in city water lines. Such pipe-fittings are cumbersome to install and are inadequate for fluid flow having high pressures. Furthermore, such pipe-fittings are not easily adaptable to pipes made of different materials (i.e., pipes made of polyvinylchloride (PVC) or polyethylene (PE), for example, instead of ductile iron). The present disclosure provides a pipe-fitting that is adequate for fluid flow at high pressures and is convenient to install. Furthermore, the pipe-fitting of the present disclosure is adaptable to pipes of different materials, such as pipes made of polyvinylchloride (PVC) or polyethylene (PE), for example.

SUMMARY

This section provides a general summary of the disclosure, and is not a comprehensive disclosure of its full scope or all of its features.

In one form, the present disclosure provides a pipe-fitting. The pipe-fitting includes a coupling and a flexible pipe-restraint gasket. The coupling includes a bell that defines a pipe insertion mouth at an end of the coupling and an inner recess. The flexible pipe-restraint gasket assembly is disposed within the inner recess and includes an annular body, a plurality of discrete gripping members and at least one extension portion. The plurality of gripping members are disposed around an outer periphery of the body. The at least one extension portion extends from the body and is disposed between a pair of the plurality of gripping members. The at least one extension portion defines a pocket.

In some configurations of the pipe-fitting of the above paragraph, the pocket includes opposing walls being non-parallel and diverging relative to each other.

In some configurations of the pipe-fitting of any one or more of the above paragraphs, the pocket includes a width. The at least one extension portion is configured to collapse thereby reducing the width of the pocket.

In some configurations of the pipe-fitting of any one or more of the above paragraphs, opposing sides of each gripping member are curved.

In some configurations of the pipe-fitting of any one or more of the above paragraphs, each gripping member includes a bottom surface and a top curved surface.

In some configurations of the pipe-fitting of any one or more of the above paragraphs, teeth extend from the bottom surface of each gripping member.

In some configurations of the pipe-fitting of any one or more of the above paragraphs, each gripping member includes a first angled surface and a second angled surface that cooperate to form a recess between two of the teeth.

In some configurations of the pipe-fitting of any one or more of the above paragraphs, the body and the at least one extension portion are made of an elastomeric material. The plurality of gripping members are made of a metallic material.

In some configurations of the pipe-fitting of any one or more of the above paragraphs, the bell includes a ridge and a sloping portion extending from the ridge. The ridge and the sloping portion cooperate to define the inner recess.

In some configurations of the pipe-fitting of any one or more of the above paragraphs, a bulbous portion is disposed at an end of the ridge.

In some configurations of the pipe-fitting of any one or more of the above paragraphs, the bulbous portion protrudes inwardly past an inner surface of the ridge.

In some configurations of the pipe-fitting of any one or more of the above paragraphs, the bulbous portion protrudes outwardly past at least a portion of an outer surface of the ridge.

In some configurations of the pipe-fitting of any one or more of the above paragraphs, the inner surface of the ridge and a line tangent to the bulbous portion in a direction parallel to a center axis of the coupling forms an angle.

In some configurations of the pipe-fitting of any one or more of the above paragraphs, the angle is between 15 degrees and 19 degrees.

In some configurations of the pipe-fitting of any one or more of the above paragraphs, a thickness of the bulbous portion is greater than a thickness of the ridge.

In some configurations of the pipe-fitting of any one or more of the above paragraphs, the bell includes a ridge and a sloping portion extending from the ridge. The ridge and the sloping portion cooperate to define the inner recess.

In some configurations of the pipe-fitting of any one or more of the above paragraphs, a bulbous portion is disposed at an end of the ridge. The bulbous portion protrudes inwardly past an inner surface of the ridge.

In some configurations of the pipe-fitting of any one or more of the above paragraphs, the inner surface of the ridge and a line tangent to the bulbous portion in a direction parallel to a center axis of the coupling forms an angle.

In another form, the present disclosure provides a pipe-restraint gasket assembly. The pipe-restraint gasket includes an annular body, a plurality of discrete gripping members and at least one extension portion. The plurality of discrete gripping members are disposed around an outer periphery of the body. The at least one extension portion extends from the annular body and is disposed between a pair of the plurality of gripping members. The at least one extension portion defining a pocket. The at least one extension portion is configured to collapse.

In yet another form, the present disclosure provides a coupling including a bell and a bulbous portion. The bell defines a pipe insertion mouth at an end of the coupling and includes a ridge and a sloping portion extending from the ridge. The ridge and the sloping portion cooperate to define an inner recess. The bulbous portion is disposed at an end of the ridge. The bulbous portion protrudes inwardly past an inner surface of the ridge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a cross-sectional view of a portion of the pipe assembly of FIG. 1 showing the pipe-restraint gasket being disposed in a coupling of the pipe assembly;

FIG. 7 is front view of the pipe assembly of FIG. 1 showing the pipe-restraint gasket being disposed in the coupling of the pipe assembly;

Corresponding reference numerals indicate corresponding parts throughout the several views of the drawings.

DETAILED DESCRIPTION

Figure 1:
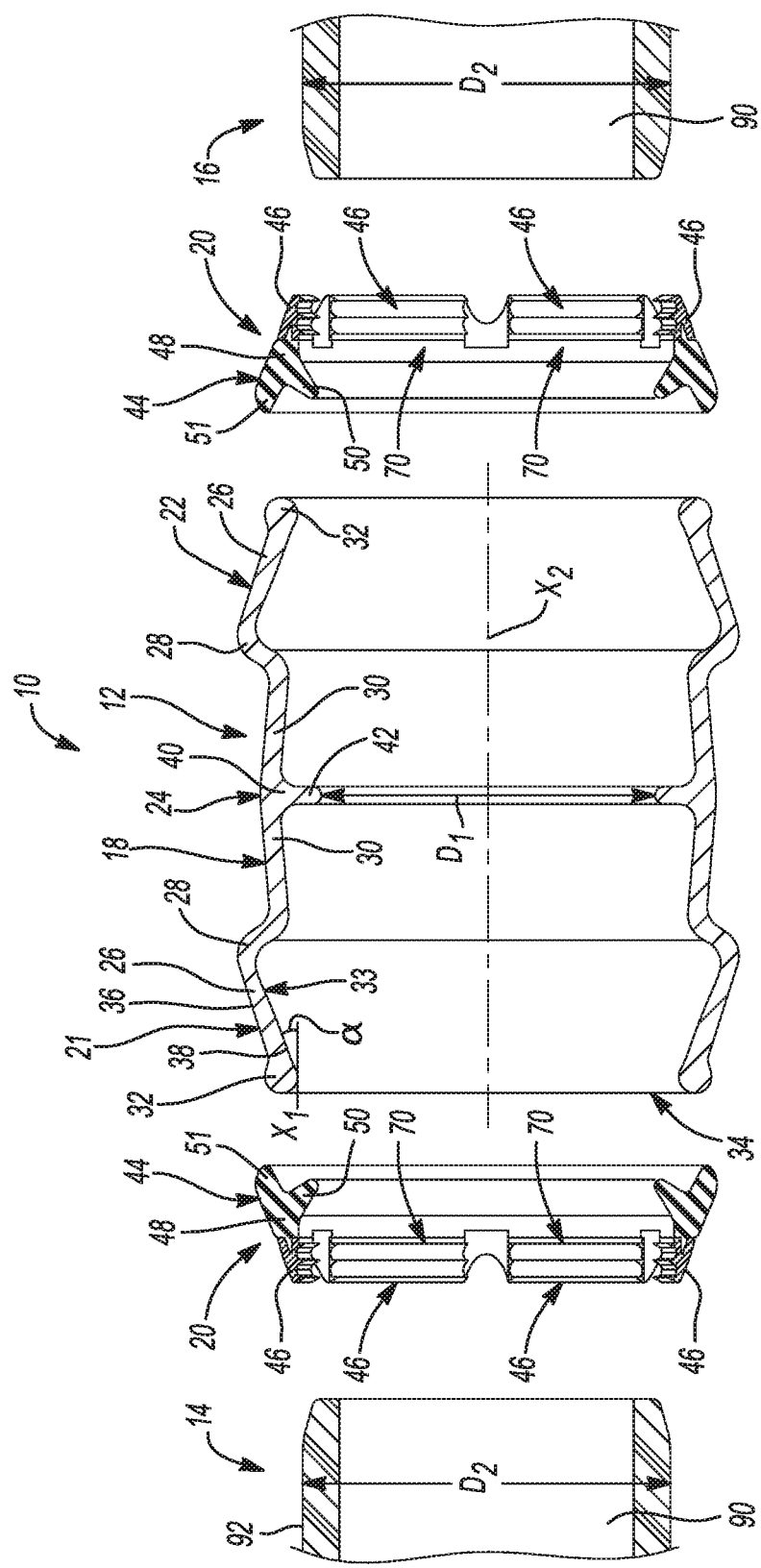
FIG. 1 is an exploded cross-sectional view of the pipe assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1, 2, 6-11 and 13, a pipe assembly 10 is provided. The pipe assembly 10 includes a pipe-fitting 12, a first pipe (or fitting) 14 and a second pipe (or fitting) 16. The pipe-fitting 12 includes a coupling 18 and a pair of pipe-restraint gaskets 20.

The coupling 18 receives the first and second pipes 14, 16 at opposing ends thereof and is made out of a metallic material (e.g., ductile iron). The coupling 18 is permitted to deflect, thereby being usable in seismic applications or where ground movement is anticipated. As shown in FIGS. 1, 2, 7 and 13, the coupling 18 is annular-shaped and includes a pair of bells 21, 22 and a middle portion 24. The pair of bells 21, 22 are symmetric to each other about the middle portion 24. Each bell 21, 22 includes a ridge 26, a sloping portion 28, a transitional portion 30 and a bulbous portion 32. As shown in FIGS. 1, 2, 6, 8-13 the ridge 26 extends radially outwardly on an angle from the bulbous portion 32 to the sloping portion 28. The sloping portion 28 extends radially inwardly on an angle from the ridge 26 to the transitional portion 30. The sloping portion 28 and the ridge 26 cooperate to define an inner circumferential recess 33. The transitional portion 30 extends axially from the sloping portion 28 to the middle portion 24.

The bulbous portion 32 is annular-shaped and is disposed at an end of the ridge 26. The bulbous portion 32 defines an opening or pipe insertion mouth 34 of a respective bell 21, 22. As shown in FIGS. 1, 6, 8-11, the bulbous portion 32 protrudes radially outwardly further than at least a portion of an outer surface 36 of the ridge 26. The bulbous portion 32 also protrudes radially inwardly further than an inner surface 38 of the ridge 26. The inner surface 38 of the ridge 26 and a line X1 extending tangent to the bulbous portion 32 in a direction parallel to a center axis X2 of the coupling 18 forms an angle $\alpha$ that is between 15 degrees and 20 degrees. The bulbous portion 32 also includes a thickness that is thicker than a thickness of the ridge 26. In this way, the bulbous portion 32 allows the ridge 26 to be thinner without compromising the strength and the functionality of the coupling 18 and while also reducing the overall weight of the coupling 18. The middle portion 24 includes an axial member 40 and a stop 42. The axial member 40 extends from an end of the transitional portion 30 of the bell 21 to an end of the transitional portion 30 of the bell 22. The annular-shaped stop 42 extends radially inwardly from an inside surface of the axial member 40 toward the center axis X2 of the coupling 18. The stop 42 defines an opening 43 having a diameter D1 that is smaller than diameters D2 of the first and second pipes 14, 16. In this way, the stop 42 prevents the first pipe 14 from being inserted through bell 21 and into the bell 22 and prevents the second pipe 16 from being inserted through bell 22 and into the bell 21.

Figure 2:
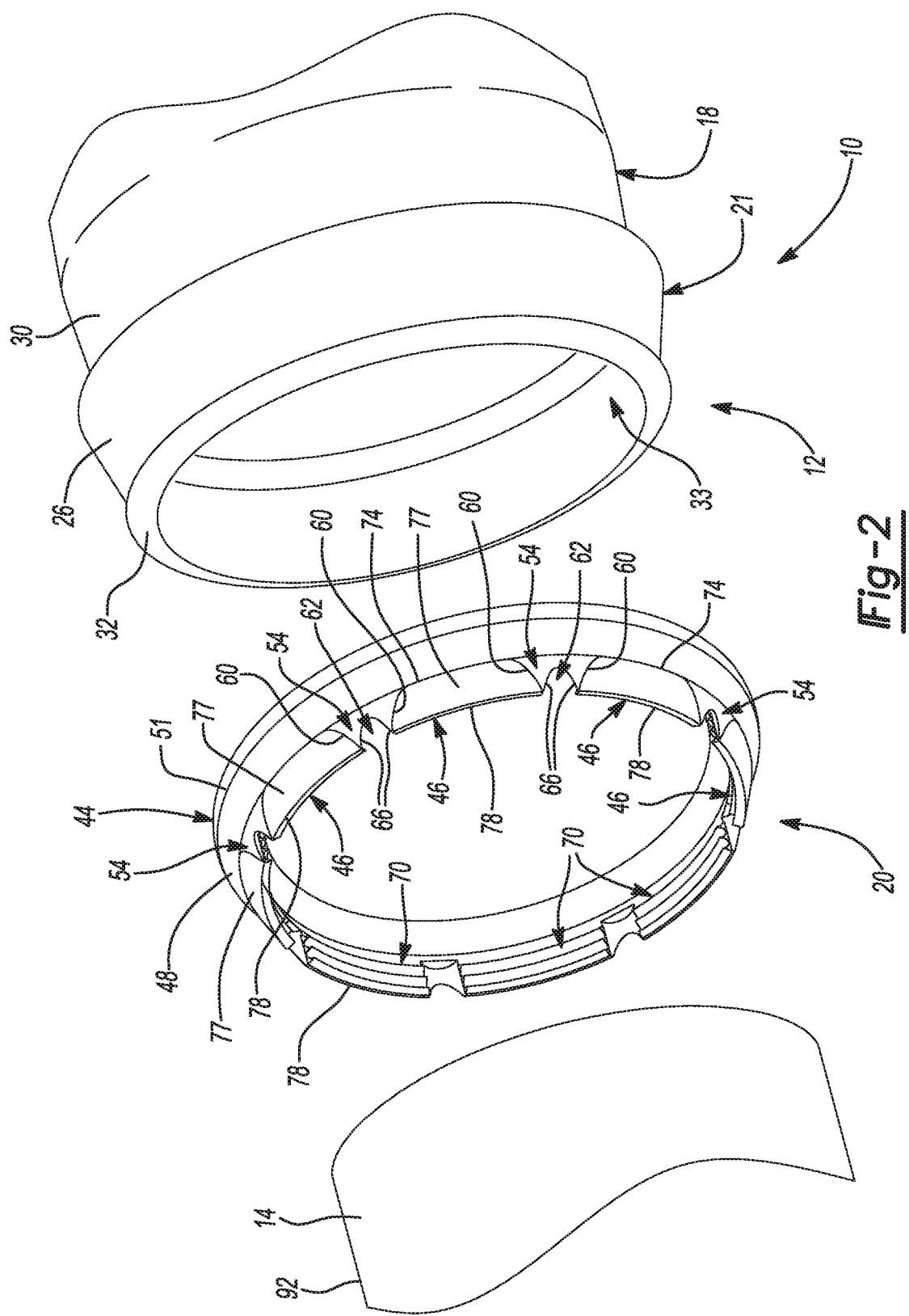
FIG. 2 is an exploded view of a portion of the pipe assembly of FIG. 1.
Figure 3:
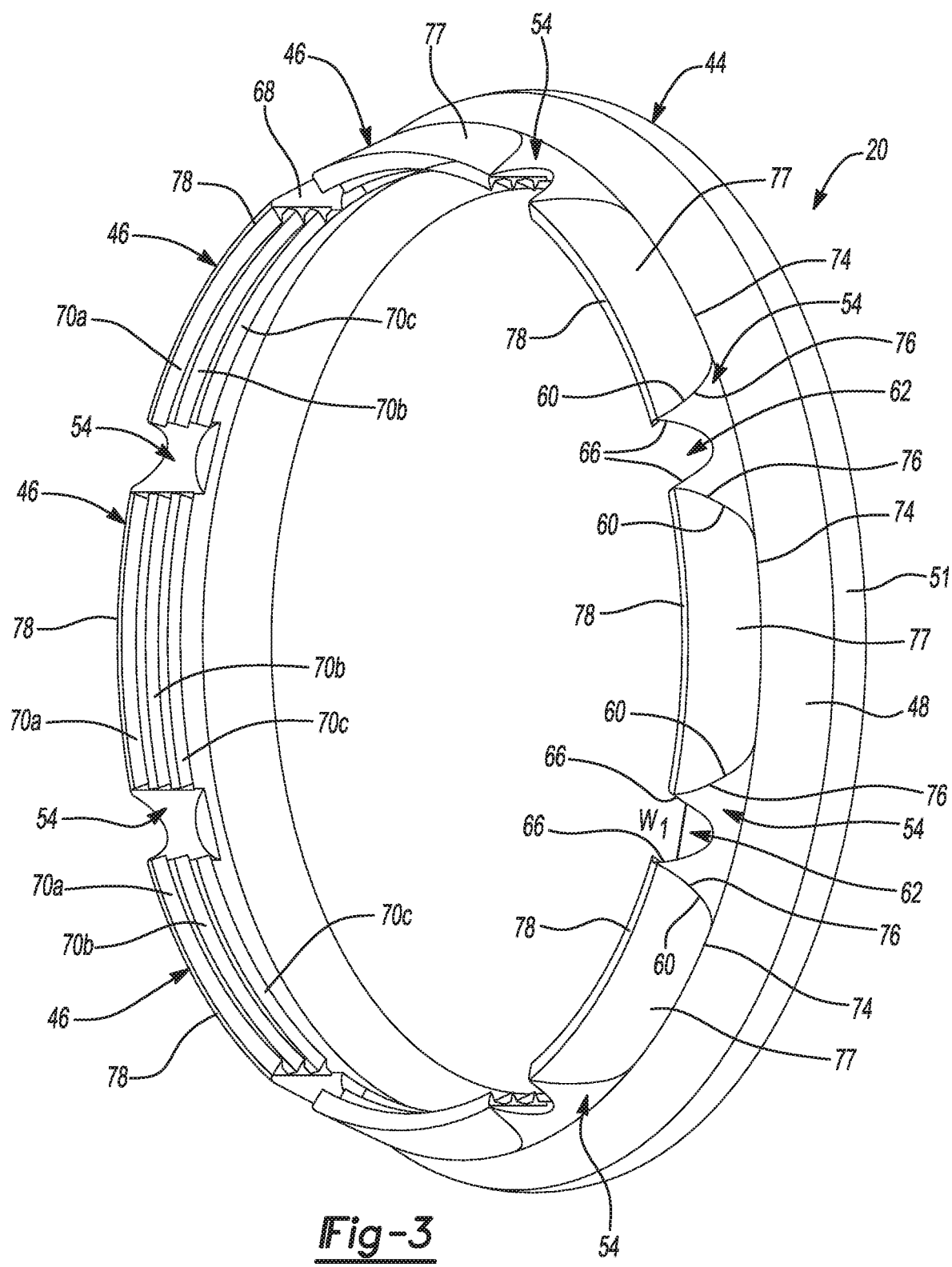
FIG. 3 is a perspective view of a pipe-restraint gasket of the pipe assembly of FIG. 1.

Each pipe-restraint gasket 20 is disposed in the inner recess 33 that is defined by the sloping portion 28 and the ridge 26. As shown in FIGS. 1-3, the pipe-restraint gasket 20 includes a flexible annular body 44 and a plurality of discrete gripping members 46 disposed around an outer periphery of the body 44. The flexible annular body 44 is made of an elastomeric material such as, styrene-butadiene rubber (SBR), ethylene-propylene-diene monomer (EDPM) rubber, or nitrile rubber, for example. In some configurations, the body 44 is a composite of rubber and plastic materials. The body 44 includes an intermediate portion 48, a pair of legs 50, 51, a plurality of attachment portions 52 and a plurality of extension portions 54.

The pair of legs 50, 51 diverge from a rear end of the intermediate portion 48 of the body 44 such that an angle $\beta$ is formed therebetween. In some configurations, the angle $\beta$ is approximately 110 degrees. In some configurations, the angle $\beta$ may be greater than or less than 110 degrees. Each triangular-shaped attachment portion 52 extends in an axial direction from a front end 55 of the intermediate portion 48 of the body 44 and includes a horizontal surface 56 and an angled surface 58.

Figure 5:
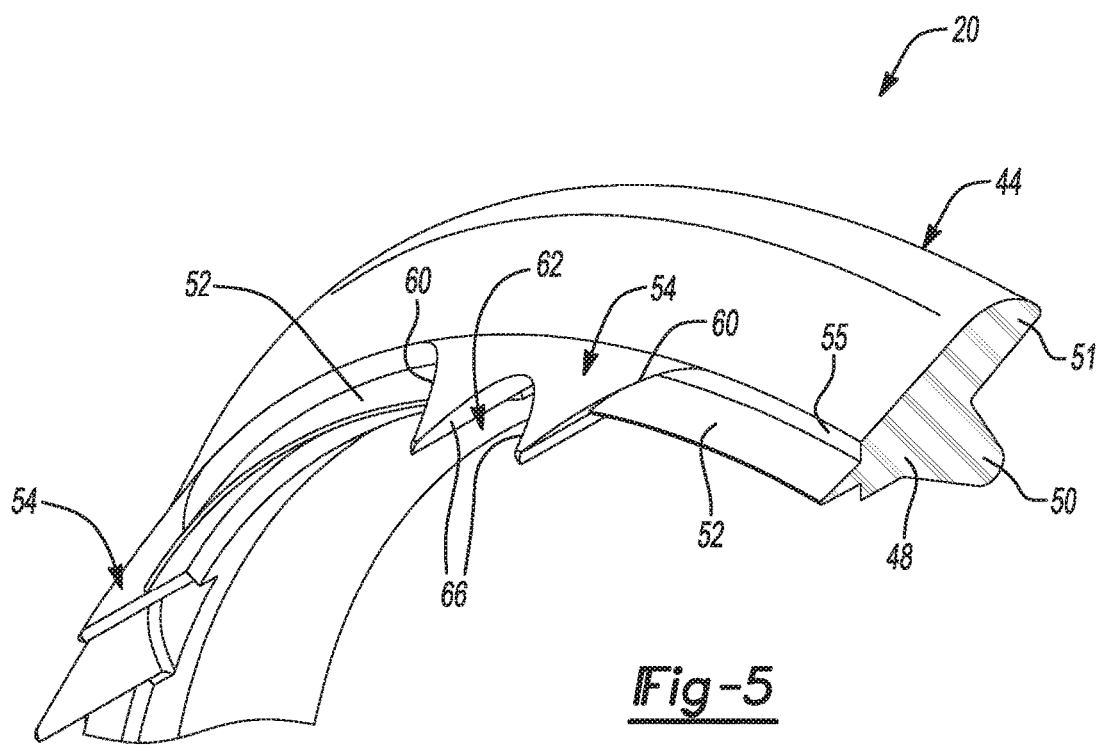
FIG. 5 is a partial perspective view of the pipe-restraint gasket of the pipe assembly of FIG. 1.

As shown in FIG. 5, each U-shaped extension portion 54 is disposed between a pair of the plurality of attachment portions 52 and extends in an axial direction from the front end 55 of the intermediate portion 48 of the body 44. Each extension portion 54 is collapsible and extends past the plurality of attachment portions 52 in the axial direction. Each extension portion 54 includes opposing curved sides or walls 60 and a U-shaped pocket or opening 62. The pocket 62 includes a width W1 that is reduced when the extension portion 54 is collapsed. The pocket 62 also defines opposing walls 66 that are non-parallel and diverge in an axial direction.

The plurality of gripping members 46 are made of a metallic material (e.g., stainless steel). In some configurations, each discrete gripping member 46 may be made of a polymeric or ceramic material. The plurality of gripping members 46 are disposed around the body 44 of the pipe-restraint gasket 20 and are attached to the body 44 of the pipe-restraint gasket 20 by a rubber-metal bonding process. That is, the plurality of gripping members 46 are manufactured and then coated with an adhesive material before being disposed into a die cavity (not shown). Once the elastomeric material is injected into the die cavity and heated, the adhesive material is activated and the plurality of gripping members 46 and the body 44 bond to each other. Each discrete gripping member 46 is bonded to the body 44 such that each extension portion 54 is disposed between a pair of the plurality of gripping members 46 (FIGS. 1-3, 8 and 13). The plurality of gripping members 46 and the plurality of extension portions 54 are also arranged in an alternating fashion. Each gripping member 46 includes a body 68 and teeth 70.

The body 68 defines a cavity (not shown) that securely receives the attachment portion 52 of the body 44 during the bonding process such that a back edge 74 (FIG. 4) of the body 68 contacts the front end 55 of the intermediate portion 48. The body 68 has a top surface 77 that is curved from a front edge 78 of the body 68 to the back edge 74 of the body 68. The body 68 also has opposing curved sides 76 that extend from the front edge 78 of the body 68 to the back edge 74 of the body 68. The opposing curved sides 76 correspond to and are attached to a curved side 60 of a respective extension portion 54.

Figure 4:
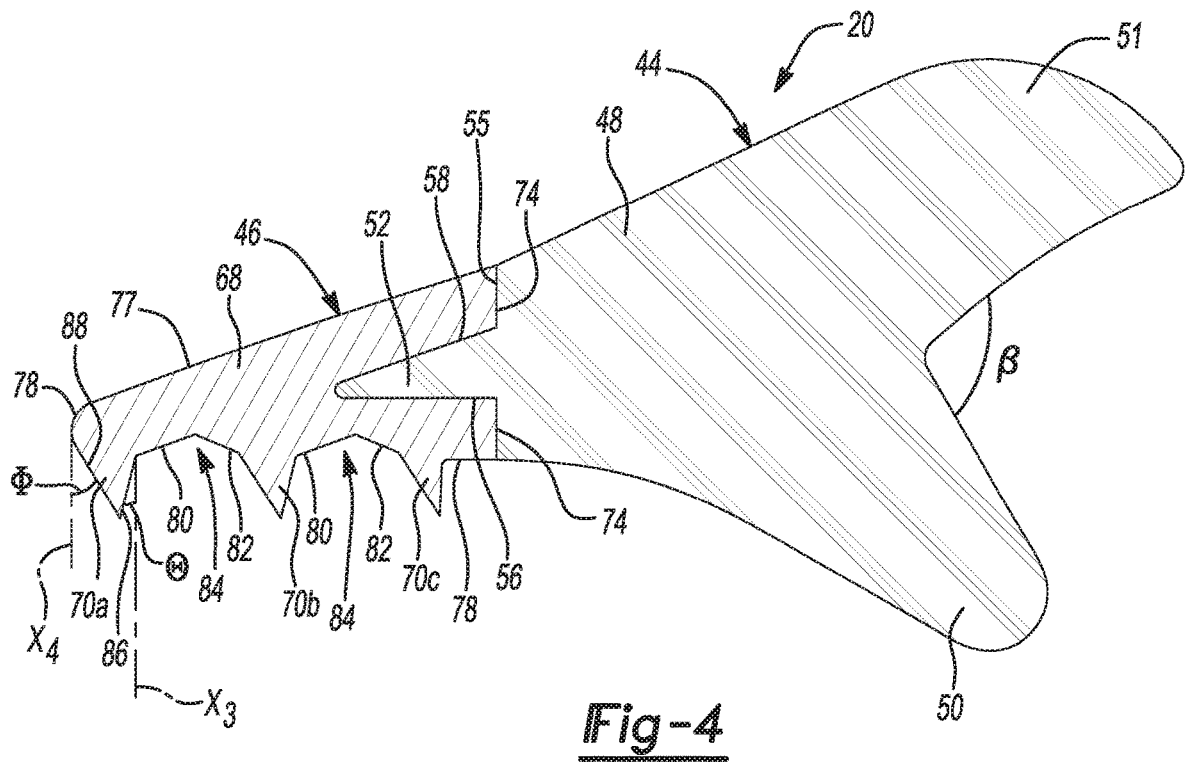
FIG. 4 is a cross-sectional view of the pipe-restraint gasket of FIG. 3.

The teeth 70 (comprised of tooth 70a, 70b and 70c) extend radially inwardly from a bottom surface 78 of the body 68. Each tooth 70a, 70b, 70c extends the length of the bottom surface 78 of the body 68 and extends parallel to the others. As shown in FIG. 4, a first angled surface 80 extends from a respective tooth 70a, 70b into the body 68 and a second angled surface 82 extends from a respective tooth 70b, 70c into the body 68. The first angled surface 80 and the second angled surface 82 cooperate to form a recess 84 in the body 68. The recess 84 is formed between a pair of teeth 70. A first surface 86 of a respective tooth 70a, 70b, 70c and a line X3 extending radially from an end of the first surface 86 in a direction perpendicular to the center axis X2 forms an angle $\theta$ that is approximately 5 degrees. A second surface 88 of the respective tooth 70a, 70b, 70c and a line X4 extending radially from an end of the second surface 88 in a direction perpendicular to the center axis X2 forms an angle $\phi$ that is approximately 30 degrees. It should be understood that the teeth 70 may have different specifications (e.g., width, height, etc.) based on the pipe that the teeth 70 are gripping (e.g., teeth gripping polyethylene (PE) pipe may be different in height or width than teeth gripping polyvinylchloride (PVC)).

Figure 13:
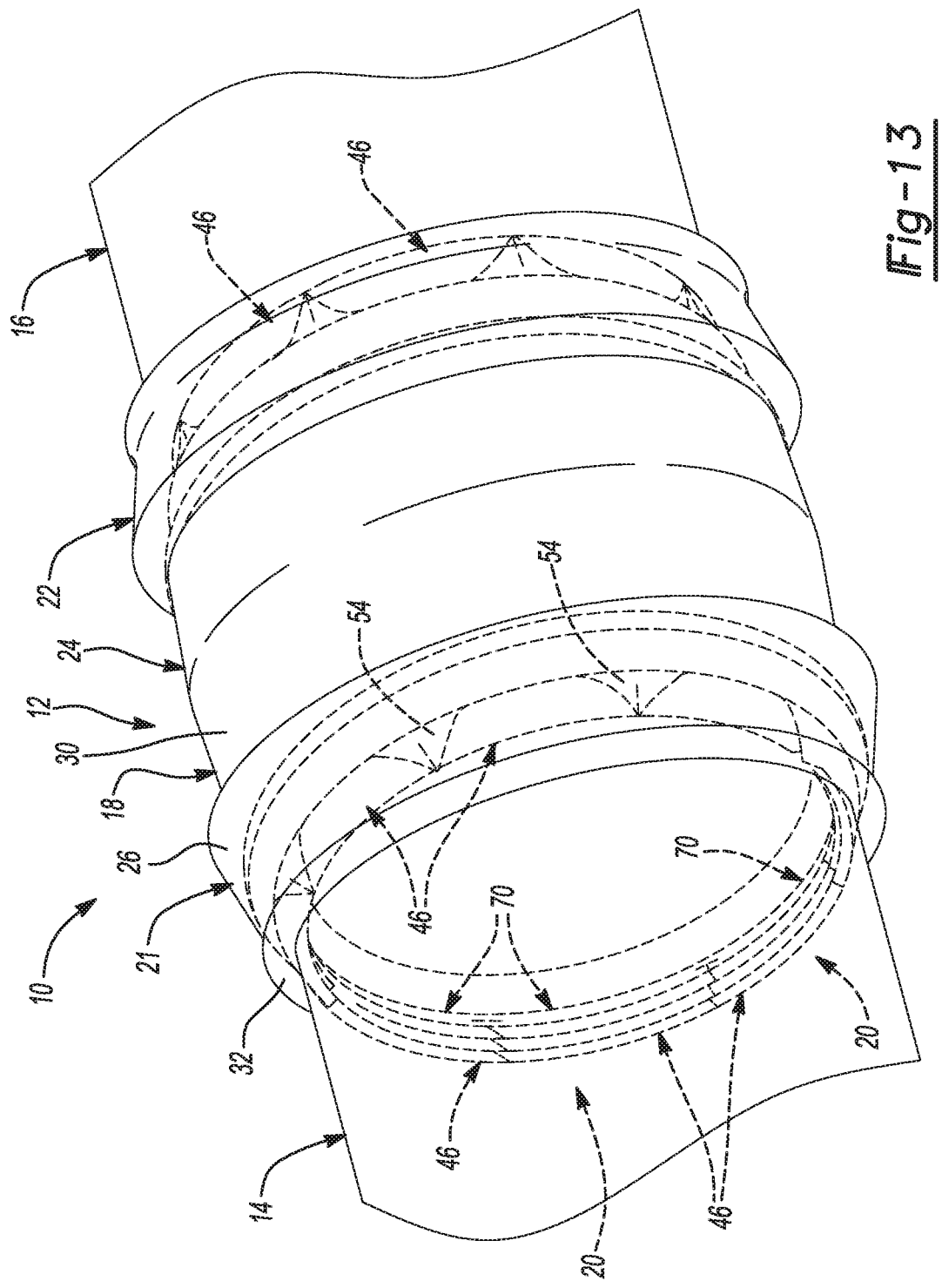
FIG. 13 is a perspective of a portion of the pipe assembly of FIG. 1 fully assembled.

As shown in FIG. 13, the first and second pipes 14, 16 are securely and sealingly attached to the pipe-fitting 12. The first and second pipes 14, 16 are tubular-shaped and may be made out of a polyvinylchloride (PVC), polyethylene (PE), engineered PVC, or metallic material (e.g., ductile iron or steel), for example. The first and second pipes 14, 16 define an opening 90 for fluid to flow therethrough.

Figure 8:
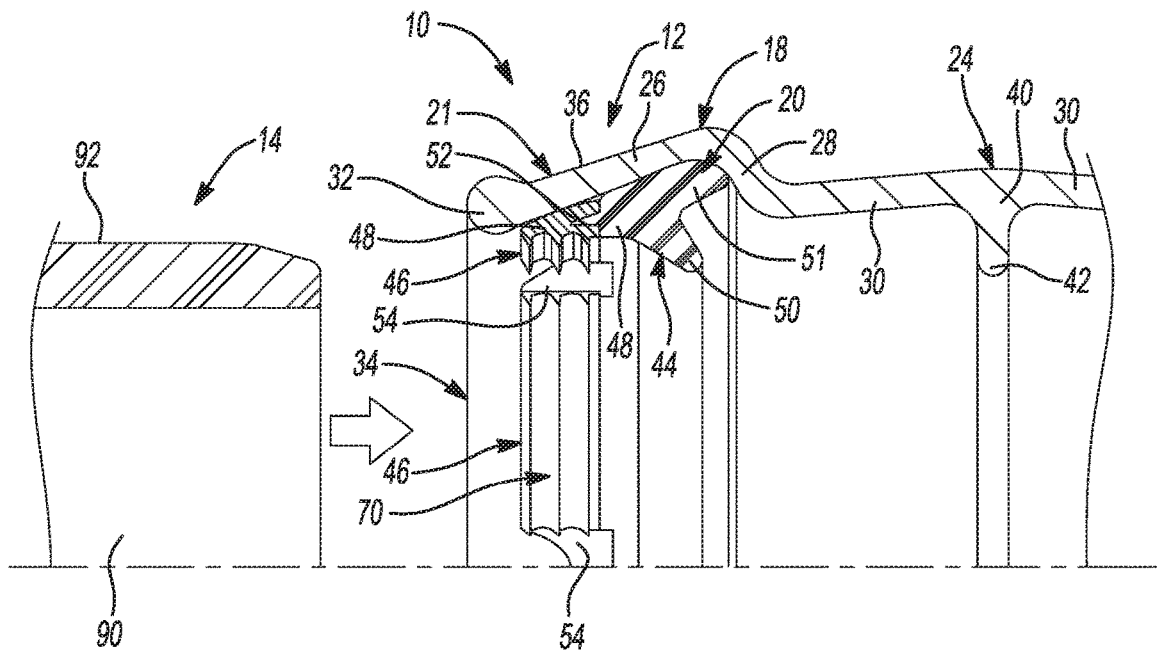
FIG. 8 is a cross-sectional view of a portion of the pipe assembly of FIG. 1 showing the pipe-restraint gasket disposed in the coupling of the pipe assembly.

With continued reference to FIGS. 1-13, assembly of the pipe assembly 10 will now be described in detail. As shown in FIG. 8, each pipe-restraint gasket 20 is first disposed in a respective inner recess 33 that is defined by the sloping portion 28 and the ridge 26. Since the diameter of the pipe-restraint gasket 20 is wider than the diameter of the opening 34 defined by the bulbous portion 32, at least a portion of the pipe-restraint gasket 20 is contorted (FIG. 7) to facilitate disposal of the pipe-restraint gasket 20 in the inner recess 33.

Figure 9:
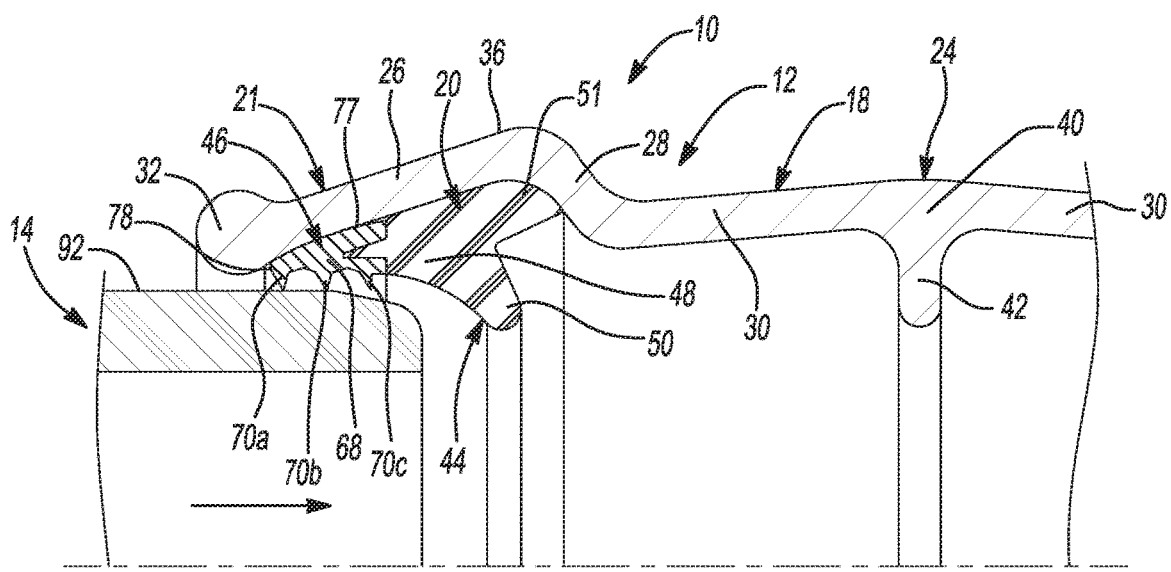
FIG. 9 is a cross-sectional view of a portion of the pipe assembly of FIG. 1 showing a pipe being inserted into the coupling.
Figure 10:
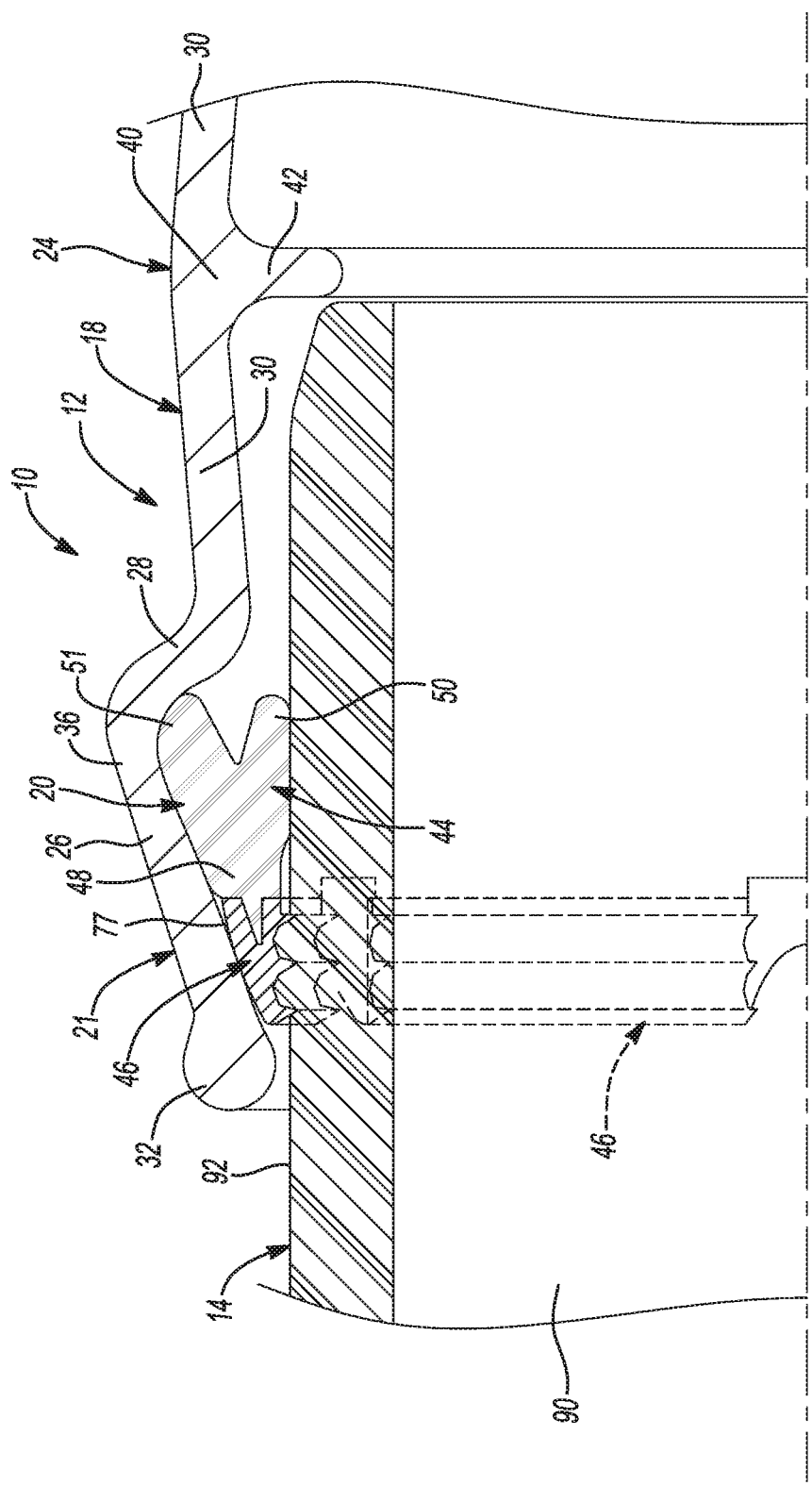
FIG. 10 is a cross-sectional view of a portion of the pipe assembly of FIG. 1 showing the pipe inserted into the coupling.

As shown in FIG. 9, the first pipe 14 is then inserted into the opening 34 defined by the bell 21 of the coupling 18. As the first pipe 14 comes into contact with the gripping members 46 of the pipe-restraint gasket 20, the gripping members 46 are pushed back into the bell 21 of the coupling 18, which causes more compression of the body 44. This also slightly widens the width W1 of the pocket 62 of the extension portions 54. As shown in FIG. 10, the first pipe 14 is inserted further into the opening 34 such that an end thereof is at or near the stop 42.

Figure 11:
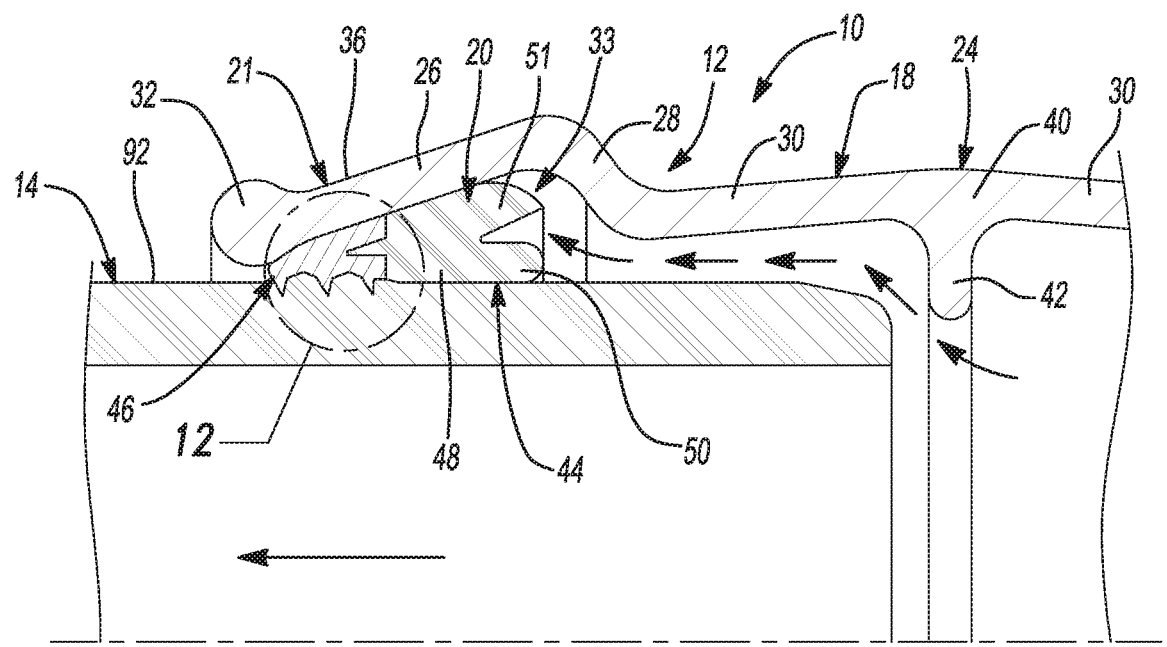
FIG. 11 is a cross-sectional view of a portion of the pipe assembly of FIG. 1 showing a force applied to the pipe.
Figure 12:
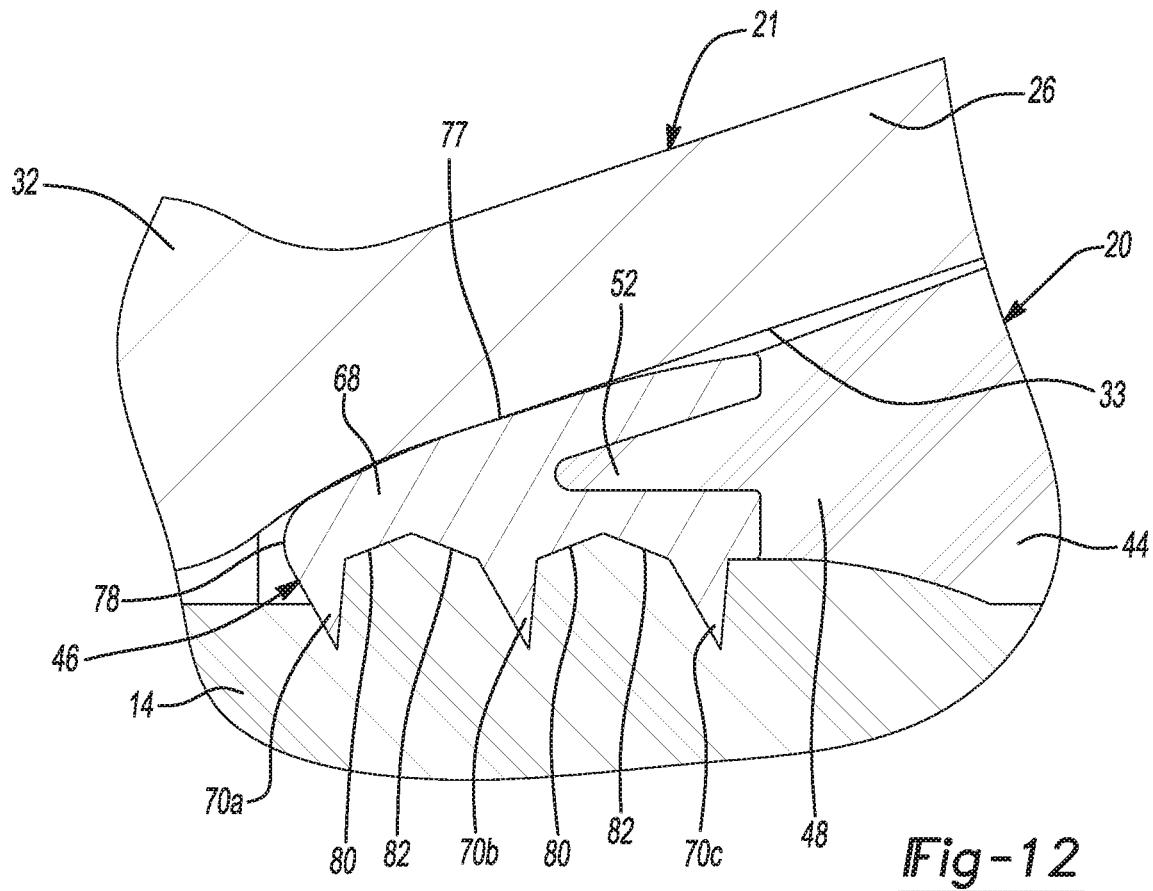
FIG. 12 is close-up view of a portion of the pipe assembly indicated as area 12 in FIG. 11.

When a force is applied to the first pipe 14 (e.g., an internal force applied to the first pipe 14 via fluid flowing through the first pipe 14 or a force pulling the first pipe 14 away from the coupling 18), the gasket 20 moves forward in the bell 21 such that the teeth 70 grips an outer wall 92 of the first pipe 14. In some configurations, as shown in FIG. 11, fluid flowing through the first pipe 14 may flow to the gasket 20 via a gap 94 between the end of the first pipe 14 and the stop 42, which causes the gasket 20 to move forward in the bell 21 such that the teeth 70 grips the outer wall 92 of the first pipe 14. As the teeth 70 grips the outer wall 92 of the first pipe 14, the pocket 62 of each extension portion 54 collapses. In this way, the gripping members 46 contact one another 360 degrees around the outer wall 92 of the first pipe 14, thereby avoiding point loading or pipe distortion. Any displaced material of the first pipe 14 is received in the recess 84 to ensure that the teeth 70 are fully engaged with the outer wall of the first pipe 14. It should be understood that the second pipe 16 is installed in a similar manner as the first pipe 14 described above.

It should be understood that during a pressure surge or water hammer, the gripping members 46 move forward such that the teeth 70 grips the outer wall 92 of the first pipe 14 and a ramp surface on the bulbous portion 32 contacts the gripping members 46 to prevent the pipe-fitting from separating (i.e., the ramp surface on bulbous portion 32 serves as a stop). This causes the gripping members 46 to form a continuous ring and develop its own hoop stress, which prevents the pipe fitting from separating.

It should also be understood that the gasket 20 of the present disclosure may be used on first and second pipes 14, 16 of different material and with varying pipe tolerances. That is, if the first and second pipes 14, 16 are slightly over tolerances then the gripping members 46 will not move forward in the bells 21, 22 as much when the gripping members 46 grip the first and second pipes 14, 16. If the first and second pipes 14, 16 are under tolerance (e.g., pipes having thinner walls such as PVC) a ramp portion of the bulbous portion 32 will prevent the pipe fitting from separating. This is achieved due to the fact that the gripping members 46 form one continuous ring that will not cause point loading or distortion of the first and second pipes 14, 16. Each gripping member 46 has three rows of teeth. Each tooth may be different in height with the shortest closest to the bell opening. This arrangement allows for easy installation of male section pipes.

Figure 14:
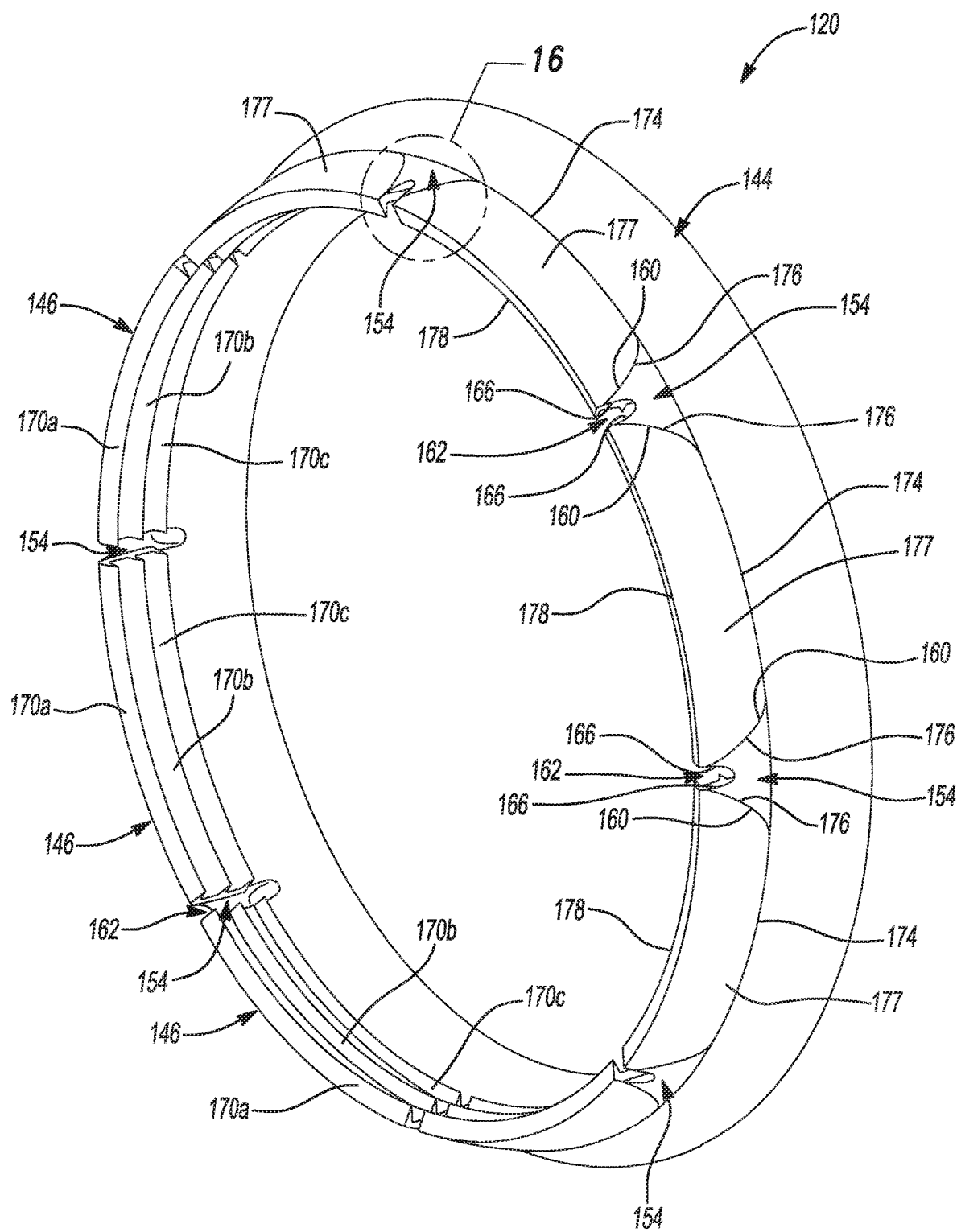
FIG. 14 is a perspective view of an alternate pipe-restraint gasket.
Figure 15:
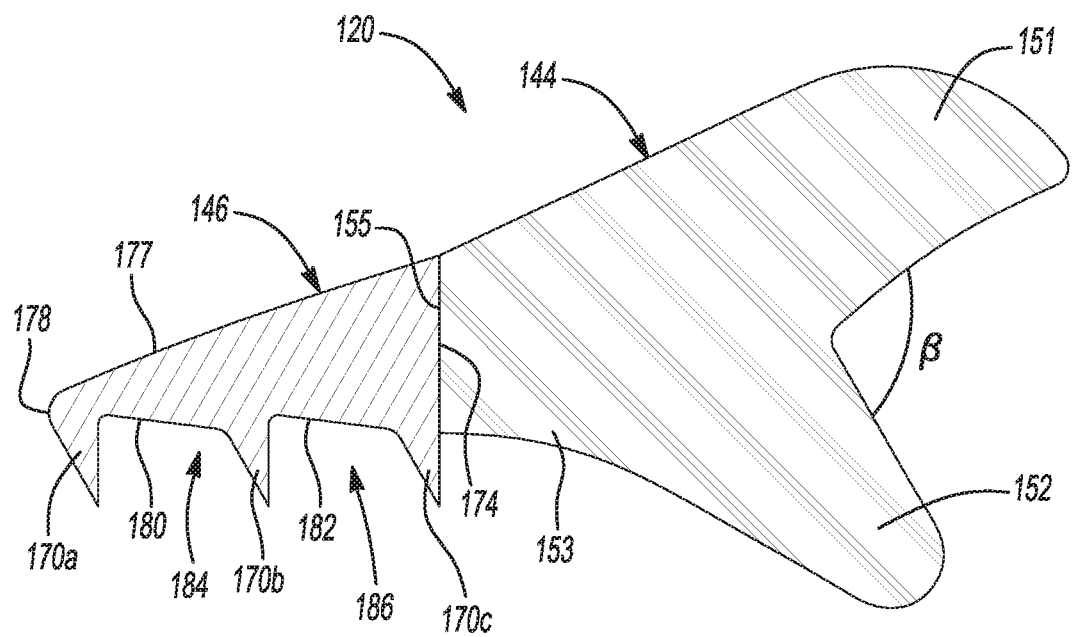
FIG. 15 is a cross-sectional view of the pipe-restraint gasket of FIG. 14.
Figure 16:
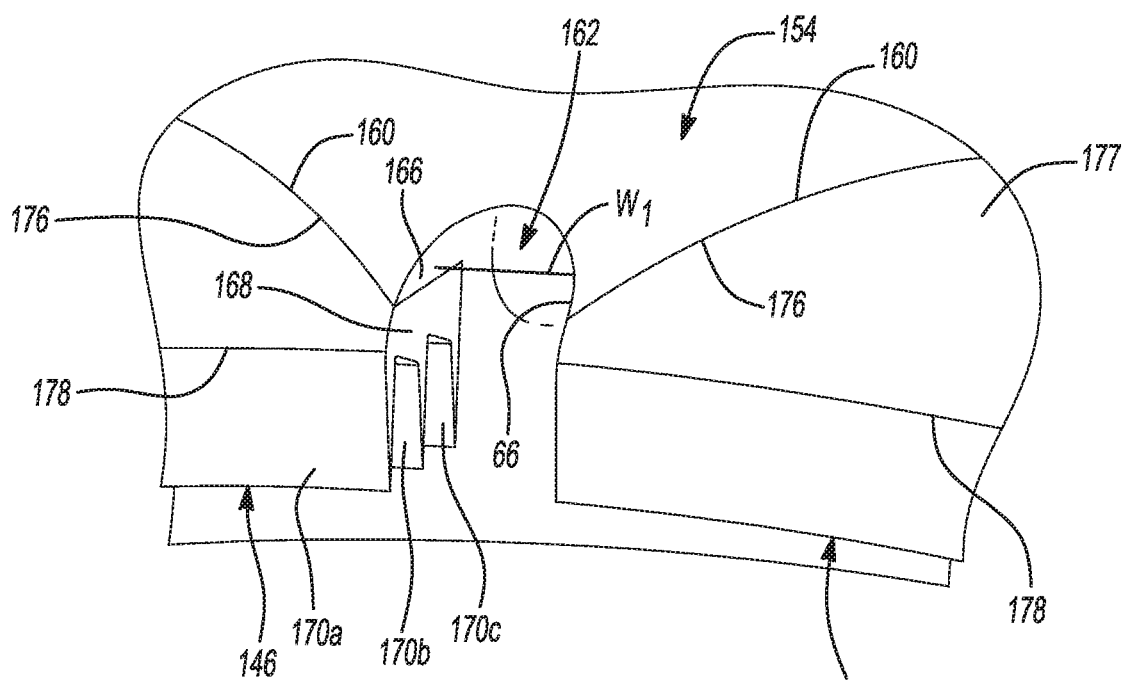
FIG. 16 is a close-up view of a portion of the pipe-restraint gasket indicated as area 16 in FIG. 14.

With reference to FIGS. 14-16, another pipe-restraint gasket 120 is provided. The pipe-restraint gasket 120 can be incorporated into the pipe assembly 10 instead of the pipe-restraint gasket 20 described above. The structure and function of the pipe-restraint gasket 120 may be similar or identical to that of the pipe-restraint gaskets 20, apart from any exceptions described below.

The pipe-restraint gasket 120 includes a flexible annular body 144 and a plurality of discrete gripping members 146 disposed around an outer periphery of the body 144. The flexible annular body 144 is made of an elastomeric material such as, styrene-butadiene rubber (SBR), ethylene-propylene-diene monomer (EDPM) rubber, or nitrile rubber, for example. In some configurations, the body 144 is a composite of rubber and plastic materials. The body 144 includes a pair of legs 150, 151, an attachment portion 153 and a plurality of extension portions 154.

The pair of legs 150, 151 diverge from a rear end of the attachment portion 153 of the body 144 such that an angle β is formed therebetween. In some configurations, the angle β is approximately 110 degrees. In some configurations, the angle β may be greater than or less than 110 degrees.

Each U-shaped extension portion 154 extends in an axial direction from a front end 155 of the attachment portion 153 of the body 144 and is collapsible. Each extension portion 154 includes opposing curved sides 160 and a U-shaped pocket or opening 162. The pocket 162 includes a width W1 (FIG. 16) that is reduced when the extension portion 154 is collapsed. The pocket 162 also defines opposing walls 166 that are non-parallel and diverge in an axial direction.

The plurality of gripping members 146 are made of a metallic material (e.g., stainless steel). In some configurations, each discrete gripping member 146 may be made of a polymeric or ceramic material. The plurality of gripping members 146 are disposed around the body 144 of the pipe-restraint gasket 120 by a rubber-metal bonding process. That is, the plurality of gripping members 146 are manufactured and then coated with an adhesive material before being disposed into a die cavity (not shown). Once the elastomeric material is injected into the die cavity and heated, the adhesive material is activated and the plurality of gripping members 146 and the body 144 are bonded to each other. Each discrete gripping member 146 is bonded to the body 144 such that each extension portion 154 is disposed between a pair of the plurality of gripping members 146. The plurality of gripping members 146 and the plurality of extension portions 154 are also arranged in an alternating fashion. Each gripping member 146 includes a body 168 and teeth 170.

The body 168 is attached to the attachment portion 153 such that a back edge 174 of the body 168 contacts the front end 155 of the attachment portion 153. The body 168 has a top surface 177 that is curved from a front edge 178 of the body 168 to the back edge 174 of the body 168. The body 168 also has opposing curved sides 176 that extend from the front edge 178 of the body 168 to the back edge 174 of the body 168. The opposing curved sides 176 correspond to and are attached to a curved side 160 of a respective extension portion 154.

The teeth 170 (comprised of tooth 170a, 170b and 170c) extend radially inwardly from a bottom of the body 168. Each tooth 170a, 170b, 170c extends the length of the bottom of the body 168 and extends parallel to the others. An angled surface 180 and the teeth 170a, 17b cooperate to define a first recess 184 and an angled surface 182 and the teeth 170b, 170c cooperate to define a second recess 186.

Figure 17:
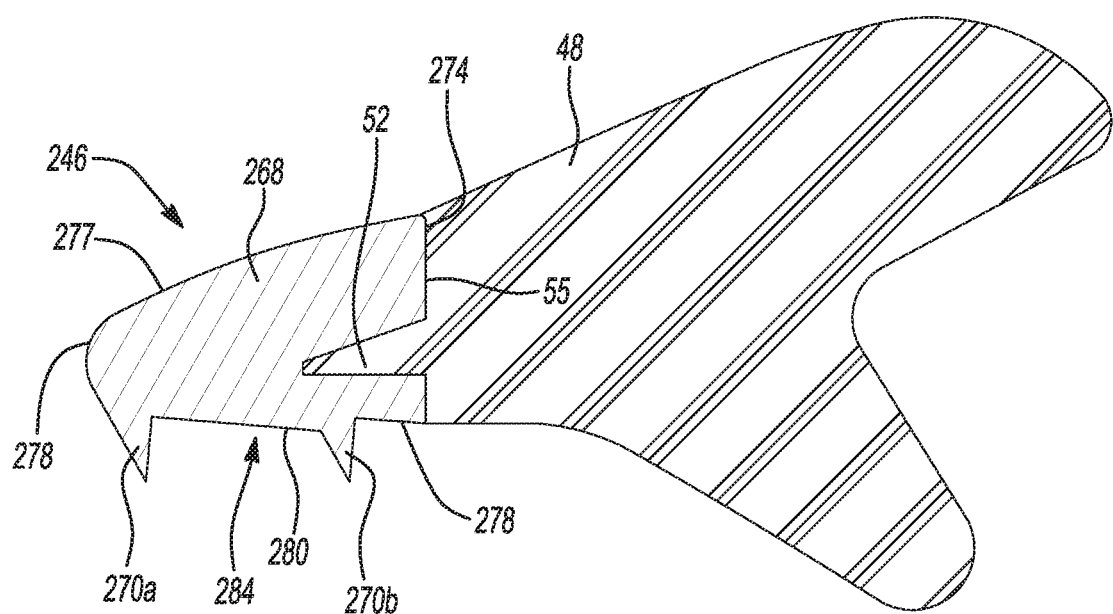
FIG. 17 is a cross-sectional view of an alternate pipe-restraint gasket.

With reference to FIG. 17, gripping members 246 (only one shown in FIG. 17) are provided. The gripping members 246 can be incorporated into the pipe-restraint gasket 20 instead of the gripping members 46 described above. The structure and function of the gripping members 246 may be similar or identical to that of the gripping members 46, apart from any exceptions described below.

Each gripping member 246 includes a body 268 and teeth 270. The body 268 defines a cavity (not shown) that securely receives the attachment portion 52 such that a back edge 274 of the body 268 contacts the front end 55 of the intermediate portion 48. The body 268 has a top surface 277 that is curved from a front edge 278 of the body 268 to the back edge 274 of the body 268. The body 268 also has opposing curved sides (not shown) that extend from the front edge 278 of the body 268 to the back edge 274 of the body 268. The opposing curved sides (not shown) correspond to and are attached to a curved side 60 of a respective extension portion 54.

The teeth 270 (comprised of tooth 270a and 270b) extend radially inwardly from a bottom 278 of the body 268. Each tooth 70a, 70b extends the length of the bottom 278 of the body 268 and extends parallel to the other. An angled surface 280 and the teeth 270 cooperate to define a recess 284.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pipe-fitting comprising: a coupling including a bell defining a pipe insertion mouth at an end of the coupling and an inner recess; and a flexible pipe-restraint gasket assembly disposed within the inner recess, the gasket including an annular body, a plurality of discrete gripping members and at least one extension portion, the plurality of gripping members being disposed around an outer periphery of the body, the at least one extension portion extending from the body and being disposed between a pair of the plurality of gripping members, the at least one extension portion defining a pocket and wherein circumferentially opposing sides of each gripping member are curved in a longitudinal direction, with opposite axially extending edges of the extension portion engaging opposing sides of the curved gripping members, with the extension portion being configured to collapse when fluid pressure is applied through the pipe.

2. The pipe-fitting of claim 1, wherein the pocket includes opposing walls being non-parallel and diverging relative to each other.

3. The pipe-fitting of claim 2, wherein the pocket includes a width configured to collapse thereby reducing the width of the pocket.

4. The pipe-fitting of claim 1, wherein each gripping member includes a bottom surface and a top curved surface.

5. The pipe-fitting of claim 4, wherein teeth extend from the bottom surface of each gripping member.

6. The pipe-fitting of claim 5, wherein each gripping member includes a first angled surface and a second angled surface that cooperate to form a recess between two of the teeth.

7. The pipe-fitting of claim 4, wherein the bell includes a ridge and a sloping portion extending from the ridge, and wherein the ridge and the sloping portion cooperate to define the inner recess.

8. The pipe-fitting of claim 7, wherein a bulbous portion is disposed at an end of the ridge, and wherein the bulbous portion protrudes inwardly past an inner surface of the ridge.

9. The pipe-fitting of claim 8, wherein the inner surface of the ridge and a line tangent (X1) to the bulbous portion in a direction parallel to a center axis (X2) of the coupling forms an angle.

10. The pipe-fitting of claim 1, wherein the body and the at least one extension portion are made of an elastomeric material, and wherein the plurality of gripping members are made of a metallic material.

11. The pipe-fitting of claim 1, wherein the gripping members contact one another 360 degrees around a pipe once the gripping members grip the pipe.

12. The pipe-fitting of claim 1, wherein the bell includes a ridge and a sloping portion extending from the ridge, and wherein the ridge and the sloping portion cooperate to define the inner recess.

13. The pipe-fitting of claim 12, wherein a bulbous portion is disposed at an end of the ridge, and wherein the bulbous portion protrudes inwardly past an inner surface of the ridge.

14. The pipe-fitting of claim 13, wherein the bulbous portion protrudes outwardly past at least a portion of an outer surface of the ridge.

15. The pipe-fitting of claim 14, wherein the inner surface of the ridge and a line tangent (X1) to the bulbous portion in a direction parallel to a center axis (X2) of the coupling forms an angle ($\alpha$).

16. The pipe-fitting of claim 15, wherein the angle is between 15 degrees and 20 degrees.

17. The pipe-fitting of claim 16, wherein a thickness of the bulbous portion is greater than a thickness of the ridge.

18. A pipe-fitting for plastic pipe comprising: a coupling including a bell defining a converging pipe insertion mouth at a forward end of the coupling and an inner recess; a flexible pipe-restraint gasket assembly disposed within the inner recess between an outer surface of the pipe and an inner wall of the converging pipe insertion mouth, the gasket including an annular body, a plurality of discrete gripping members, the plurality of gripping members being disposed around an outer periphery of the body and being initially spaced apart, circumferentially opposing sides of each gripping member being curved in a longitudinal direction, with each gripping member being curved at a forwardly diverging angle relative to adjacent gripping members; a plastic pipe having one end inserted into the gasket, with the gripping members remaining spaced apart; and the gasket being configure to move forward in the converging pipe insertion mouth of the bell and collapse to bring the gripping members in contact with each other and grip the plastic pipe 360 degrees around the pipe when fluid pressure is applied to avoid point loading or distortion of the plastic pipe.

19. The pipe fitting of claim 18 which further comprise an extension portion between each gripping member, with opposing axially extending sides of each extension portion engaging opposing sides of adjacent gripping members, the extension portion being configured to collapse.

* * * * *